United States Patent [19]

Haensel

[11] 3,901,800

[45] Aug. 26, 1975

[54] SEPARATION OF STRENGTH-DEFLECTIVE REFRACTORY INORGANIC OXIDE PARTICLES

[75] Inventor: Valdimir Haensel, Hinsdale, Ill.

[73] Assignee: Universal Oil Products Company, Des Plaines, Ill.

[22] Filed: Apr. 19, 1974

[21] Appl. No.: 462,451

[52] U.S. Cl. .................. 209/162; 209/4; 209/173
[51] Int. Cl. ............................................. B03d 1/00
[58] Field of Search ..................... 209/4, 162–165, 209/172, 172.5, 173; 73/32

[56] References Cited
UNITED STATES PATENTS

| | | | |
|---|---|---|---|
| 1,703,065 | 2/1929 | Hauman | 209/4 |
| 1,885,988 | 11/1932 | Chapman | 209/173 |
| 1,887,239 | 11/1932 | Hansen | 209/173 |
| 2,451,528 | 10/1948 | Armstrong | 209/173 X |
| 2,483,372 | 9/1949 | Payne | 209/172 |
| 2,508,867 | 5/1950 | Rompino | 209/4 |
| 2,643,215 | 6/1953 | Huge | 209/172.5 X |
| 2,828,860 | 4/1958 | Morris | 209/4 |
| 3,362,531 | 1/1968 | Johnson | 209/173 X |

*Primary Examiner*—Robert Halper
*Attorney, Agent, or Firm*—James R. Hoatson, Jr.; Robert W. Welch; William H. Page, II

[57] ABSTRACT

In the manufacture of refractory inorganic oxide particles suitable for use as a catalyst or a catalyst support, strength-defective particles are separated by a method based on the flotation characteristics of the particles.

4 Claims, No Drawings

SEPARATION OF STRENGTH-DEFLECTIVE REFRACTORY INORGANIC OXIDE PARTICLES

Catalytic materials are frequently supported on a particulate refractory inorganic oxide support or carrier material in the form of pills, pellets, extrudates, spheres, granules or other particulate form. In a number of applications, the overall performance of the catalytic composite is judged not only on its activity, selectivity and stability with respect to a particular conversion process, but also on the physical durability of the catalyst. Physical durability is of particular importance in applications where the catalyst particles are subjected to vibration, abrasion and general movement in a reactor or catalytic converter.

Although the average strength of the particles may be quite acceptable, it is the disintegration of the relatively weak particles which leads to catalyst loss and the formation of "fines" which accumulate to plug retaining screens and effect an undue pressure drop across a catalyst bed. In addition, the disintegration of the weaker particles of a tightly packed catalyst bed promotes excessive movement of the particles in contact with each other resulting in a further loss of catalyst through abrasion.

In the manufacture of refractory inorganic oxide particles suitable for use as a catalyst, or as a catalyst base, support or carrier material, it is therefore highly desirable to separate the strength-defective particles from the total product. It is then an object of this invention to present a novel method of separating strength-defective refractory inorganic oxide particles from refractory inorganic oxide particles prepared by conventional methods of manufacture.

In one of its broad aspects, the method of this invention comprises selecting at least one of said particles of desired particle strength and establishing a period of time within which said particles will float on the surface of a given liquid; thereafter floating the remainder of said particles of undetermined strength on the surface of said liquid, and separating as strength-defective particles those which sink below the surface within said period of time.

Other objects and embodiments of this invention will become apparent in the following detailed specification.

The method of this invention is based on the concept that a particulate catalyst, or a particulate catalyst support or carrier material, which has been subjected to prior high temperature calcination has a certain capacity for absorbing water or other liquid when placed in contact therewith. When the particle becomes saturated its density exceeds that of the liquid and the particle sinks. The tendency of a particle to sink is influenced not only by the greater or lesser amount of micro or macropores but also by the same factors affecting particle strength, that is, by surface cracks and imperfections which enable the particle to expel air more rapidly and thus increase the particle capacity for water or other liquid.

It will be appreciated that the present invention is applicable to the separation of strength-defective particles from refractory inorganic oxide particles manufactured by the various and well-known techniques including the pilling, pelleting, extruding, etc., of a powdered preformed refractory inorganic oxide with or without the use of a binder. The refractory inorganic oxides herein contemplated are those commonly employed as a catalyst, or as a catalyst support or carrier material, and include alumina, silica, zirconia, chromia, thoria, boria, magnesia, titania, and the like, and also composite thereof such as alumina-silica, alumina-zirconia, alumina-chromia, silica-zirconia, etc. The method of this invention is particularly useful for the separation of strength-defective refractory inorganic oxide particles precipitated from a sol as spheroidal gel particles and subsequently calcined. For example, the method is particularly useful with respect to the manufacture of low density alumina spheres by the oil drop method described by Hoekstra in U.S. Pat. No. 3,620,214. Briefly, the oil drop method comprises dispersing an alumina sol, such as results from digesting aluminum in hydrochloric acid under controlled conditions, as droplets in a hot oil bath whereby gelation occurs with the formation of spheroidal gel particles. In this type of operation, the alumina is set chemically utilizing ammonia as a neutralizing or setting agent. Usually, the ammonia is furnished by an ammonia precursor such as hexamethylenetetramine which is included in the sol. Only a fraction of the ammonia precursor is hydrolyzed or decomposed to ammonia in the relatively brief period during which initial gelation occurs with the formation of firm spheroidal particles. During the subsequent aging process, usually in the hot forming oil, the residual ammonia precursor retained in the gel particles continues to hydrolyze and effect further polymerization of the alumina whereby desirable pore characteristics are established. After a suitable aging period, usually from about 10 to about 24 hours at temperatures in the 50°–105° C. range, the alumina spheres are washed, dried and calcined at a temperature of from about 425° to about 750° C. Spheroidal alumina particles prepared in this manner are typically characterized by an average bulk density in the range of from about 0.25 to about 0.8 grams per cubic centimeter.

In illustration of the method of this invention, ⅛ inch diameter alumina spheres, prepared substantially as above described, were dispersed on a water surface at room temperature. The spheres which remained afloat in excess of three seconds were recovered separately as were those which sank to the bottom of the vessel, and both groups were dried and calcined at 650° C. Twenty spheres, randomly selected from each of said groups, were evaluated for crushing strength. Each particle was crushed in an apparatus constructed in such a manner that force was applied continuously and at a uniform rate beginning with a zero load. The apparatus consisted essentially of a balance beam resting on a knife edge with an anvil at one end a unit distance from the knife edge, and a cup on the opposite end and four times the unit distance from the knife edge. The particle to be crushed was placed on the anvil, the beam balanced with a spirit level, and lead shot was poured into the cup at the rate of 9 pounds per minute thus applying a load on the particle at the rate of 36 pounds per minute. The weight of the shot required to crush the particle was multiplied by four to give the actual crushing strength of the particle. Of the spheres that floated for three seconds or more, 95% had a crushing strength of 5.5 pounds or greater, and 85% had a crushing strength of 6 pounds or greater. The average crushing strength of the spheres which floated was 8.0 pounds. Of the spheres which sank within three seconds, 85% had a crushing strength of 5.3 pounds or less, and 65% had a crushing strength of 4.4 pounds or less. The average crushing strength of the spheres which sank was 4.8 pounds. The distribution of the crushing strength for the two products makes it apparent that the method of this invention for removing the weak particles from the total stream represents an effective means of separation.

The method of this invention can be effected in a continuous manner by continuously feeding the calcined particles onto the surface of a stream of water processed horizontally through an elongated vessel at a control rate. The vessel is provided with a subsurface weir or retaining screen spaced at a predetermined distance upstream from the point of entry of said particles onto the water surface, and at a distance below the surface permitting a smooth flow of water and particles to pass over the upper limits thereof. Thus, the particles which float on the water surface for a predetermined period of time will be carried past the retaining screen and collected downstream thereof in a basket or other suitable means, and the strength-defective particles will sink and be recovered upstream of said weir or retaining screen. One or more retaining screens may be disposed at spaced intervals and/or at varied depths downstream of the initial retaining screen for the recovery of particles rated as to strength.

Once the time period has been established with respect to a particular manufacturing process, the time period may be employed in the subsequent and continued manufacture of particles by said process provided that the process has not been altered in a manner effecting any substantial change in the chemical and/or physical properties of the product particles.

I claim as my invention:

1. In the manufacture of refractory inorganic oxide catalyst support particles of a given average bulk density between 0.25 and 0.8 grams per cubic centimeter utilizing high temperature calcination, said manufacture producing particles of varying crush-strength, a method of removing those particles of a crush-strength below a preselected level which comprises:
   a. floating a plurality of particles selected from the particles of varying crush-strength on the surface of a given liquid;
   b. measuring the flotation times of the selected particles of step (a);
   c. measuring the crush-strength of the particles of step (a);
   d. determining the flotation time of the selected particles which possess a crush-strength of the preselected level;
   e. after determination of the flotation time of step (d), floating the particles of varying crush-strength on the surface of said liquid;
   f. separating the particles which sink below the surface of said liquid within the floating time determined in step (d) from the particles which do not sink within the floating time;
   g. removing the particles which sink in step (f) as the particles of crush-strength below the predetermined value.

2. The method of claim 1 further characterized in that said refractory inorganic oxide particles are alumina particles.

3. The method of claim 1 further characterized in that said refractory inorganic oxide particles are spheroidal alumina particles prepared by the oil drop method.

4. The method of claim 1 further characterized in that said liquid is water.

* * * * *

UNITED STATES PATENT OFFICE
CERTIFICATE OF CORRECTION

Patent No. 3,901,800   Dated August 26, 1975

Inventor(s) Vladimir Haensel

It is certified that error appears in the above-identified patent and that said Letters Patent are hereby corrected as shown below:

In the title, "Strength-Deflective" should read -- Strength-Defective --; the inventor's name, "Valdimir" should read -- Vladimir --; column 1, line 1, "Strength-Deflective" should read -- Strength-Defective --.

Signed and Sealed this eleventh Day of November 1975

[SEAL]

Attest:

RUTH C. MASON
Attesting Officer

C. MARSHALL DANN
Commissioner of Patents and Trademarks